(12) United States Patent
Wang et al.

(10) Patent No.: US 8,210,054 B2
(45) Date of Patent: Jul. 3, 2012

(54) METHOD FOR INSTALLING AND OPERATING A MASS FLOWMETER AND MASS FLOWMETER

(75) Inventors: Tao Wang, Canterbury (GB); Yousif Hussain, Favell (GB)

(73) Assignee: Krohne AG, Basel (CH)

( * ) Notice: Subject to any disclaimer, the term of this patent is extended or adjusted under 35 U.S.C. 154(b) by 195 days.

(21) Appl. No.: 12/822,786

(22) Filed: Jun. 24, 2010

(65) Prior Publication Data

US 2010/0326204 A1      Dec. 30, 2010

(30) Foreign Application Priority Data

Jun. 26, 2009 (DE) .................. 10 2009 030 903

(51) Int. Cl.
*G01F 1/84* (2006.01)
(52) U.S. Cl. ................................. 73/861.355
(58) Field of Classification Search ............ 73/861.355–861.357
See application file for complete search history.

(56) References Cited

U.S. PATENT DOCUMENTS

| | | | |
|---|---|---|---|
| 4,768,384 A | 9/1988 | Flecken et al. | |
| 5,381,697 A | 1/1995 | van der Pol | |
| 5,773,727 A | 6/1998 | Kishiro et al. | |
| 6,327,915 B1 | 12/2001 | Van Cleve et al. | |
| 6,512,987 B1 * | 1/2003 | Pattern | 702/100 |
| 7,831,400 B2 * | 11/2010 | Stack et al. | 702/59 |

FOREIGN PATENT DOCUMENTS

| | | |
|---|---|---|
| DE | 10 2008 003 353 A1 | 7/2009 |
| WO | 2008/039203 A1 | 4/2008 |

* cited by examiner

*Primary Examiner* — Jewel V Thompson
(74) *Attorney, Agent, or Firm* — Roberts Mlotkowski Safran & Cole, P.C.; David S. Safran

(57) ABSTRACT

A method for installing and operating a Coriolis mass flowmeter operating having a measuring tube, wherein the measuring tube is excited to vibrate, a phase shift of the vibration of the measuring tube which is dependent on the mass flow of the measuring tube or a corresponding time difference is determined, the temperature of the measuring tube is determined and the corresponding mass flow is calculated using the determined time difference and the determined temperature by means of a computation rule. Highly accurate measurements are possible in that in the computation rule, at least one known theoretical or empirical material temperature dependence influencing the mass flow is taken into account by determining a device-specific temperature dependence of the mass flowmeter influencing the mass flow through a subsequent calibration process and the known theoretical or empirical material temperature dependence and the device-specific temperature dependence are used in determining the mass flow.

11 Claims, No Drawings

METHOD FOR INSTALLING AND OPERATING A MASS FLOWMETER AND MASS FLOWMETER

BACKGROUND OF THE INVENTION

1. Field of the Invention

The invention relates to a method for installing and operating a mass flowmeter operating according to the Coriolis principle having a measuring tube, wherein the measuring tube is excited to vibrate, a phase shift of the vibration of the measuring tube which is dependent on the mass flow of the measuring tube or, respectively, a time difference ($t_d$) corresponding to this is determined, the temperature of the measuring tube is determined and the corresponding mass flow is calculated using the determined time difference ($t_d$) and the determined temperature (T) by means of a computation rule. Furthermore, the invention relates to a mass flowmeter operating according to the Coriolis principle that is installed in such a manner that the above method can be carried out.

2. Description of Related Art

Mass flow meters operating according to the Coriolis principle have been known for a long time and have been used in widely differing ranges of technology, especially in industrial process engineering. Mass flow meters operating according to the Coriolis principle are constructively differently configured; they can consist of one single or a plurality of straight or curved tube or tubes, which, however, is not important in connection with the present invention. When a mass flow meter comprising "a" measuring tube is mentioned hereinafter, this should not be understood as restrictive but rather, the associated teaching can easily be applied to mass flow meters having a plurality of measuring tubes.

Regardless of their specific embodiment, mass flow meters operating according to the Coriolis principle have in common that their measuring tube is excited to vibrate by a—generally centrally arranged—vibration generator. In the state of the measuring tube with no through-flow, the measuring tube vibrates symmetrically about the excitation point. Depending on the flow of a medium through the measuring tube—and therefore depending on the mass flow of the medium through the measuring tube—the form of the vibration changes on both sides of the excitation point and therefore becomes asymmetrical if symmetry had existed previously. The vibration components detected by the measured value sensor on both sides of the excitation point are phase-shifted, the phase shift being proportional to the actual mass flow. The phase shift of the vibrations detected on both sides of the excitation point naturally corresponds to a time difference, i.e. for example the time difference between the zero crossing of the measuring tube on one side of the excitation point and the zero crossing of the measuring tube on the other side of the excitation point of the measuring tube.

Apart from the general desire to improve a measuring device with regard to its accuracy, particularly stringent accuracy requirements are imposed on mass flowmeters in specific cases of application e.g. in applications requiring calibration which require Coriolis mass flow meters that can be calibrated; this is the case, for example, in the monitored distribution of fluid media—custody transfer. In this case, the required accuracies can be in the per-mill range.

Mass flow meters, including ones that can not be calibrated, are usually calibrated at the factory, i.e. in a test rig exposed to a defined mass throughput (standing/flying start-and-stop method), wherein a calibration factor is calculated from the mass flow determined by the mass flowmeter and the actual mass flow pre-defined with a high accuracy, this calibration factor is taken into account within a computation rule, wherein the computation rule converts the time difference present as a measured quantity into a corresponding value for the mass flow with the aid of the calibration factor. Such a computation rule looks like the following:

$$\dot{m} = K_R t_d. \tag{1}$$

The calibration of the mass flowmeters is, in this case, made at a fixed, well-defined temperature, namely the reference temperature, which is close to the expected operation temperature, which can, for example, be 20° C.

Experience shows that the accuracy of the measurement result at an operating temperature of the Coriolis mass flowmeter differing from the reference temperature can be poorer, possibly even departing from the still-accepted accuracy range. In order to maintain the measurement accuracy despite an operating temperature differing from the reference temperature, it is known from the prior art to determine the temperature T of the measuring tube and quite especially take into account the dependence of Young's modulus E of the material of the measuring tube on the temperature of the measuring tube within the scope of the computation rule. This is based on the fact that the vibration properties of the Coriolis measuring tube depend appreciably on the Young's modulus E of the material of the measuring tube and thus a temperature dependence of the Young's modulus immediately has the effect as a temperature dependence of the vibration property of the measuring tube. This relation is known and, for example, can be seen using the formulation according to Equation 2:

$$\dot{m} = \frac{C \cdot EI_p}{\psi\left(\frac{x_1}{1}\right)1^3} t_d. \tag{2}$$

In Equation 2,
C is a constant
E is Young's modulus of the material of the measuring tube
$I_p$ is the moment of inertia of the measuring tube, $$I_p = \frac{\pi}{64}(D^4 - d^4),$$

where D is the outside diameter and d is the inside diameter of the measuring tube,
$\psi(\cdot)$ is a function along the distance of the measuring tube, where the value at the location of the sensor $$\frac{x_l}{l}$$

is of interest.

However, it has been found that in the case of large temperature fluctuations, compensation or allowance for the temperature dependence of Young's modulus of the measuring tube does not yield a sufficient result with regard to measuring accuracy. This particularly affects applications of mass flowmeters in which extremely cold media (e.g. liquid nitrogen, boiling point: −195.80° C.;) or extremely hot media flow through the measuring tube.

DESCRIPTION OF THE INVENTION

Therefore, it is the object of the present invention to—at least partly—avoid the indicated disadvantages in the known method for operating a Coriolis mass flowmeter or in known mass flowmeters, in particular to improve the temperature dependence of the accuracy of mass flowmeters even in cases of extreme temperature differences.

The indicated object is initially and substantially achieved according to the invention in the method in question for operating a mass flowmeter operating according to the Coriolis principle in that, in the computation rule, at least one known theoretical or empirical material temperature dependence $K_T$ influencing the mass flow is taken into account, that, under consideration of the known theoretical or empirical material temperature dependence $K_T$ influencing the mass flow, a device-specific temperature dependence e of the mass flowmeter influencing the mass flow is determined through a subsequent calibration process and that, in the computation rule, the known theoretical or empirical material temperature dependence $K_T$ as well as the device-specific temperature dependence e are taken into account in determining the mass flow.

Through the method according to the invention, it is possible to differentiate between different temperature-influencing factors, in that, initially, a known theoretical or empirical material temperature dependence $K_T$ influencing the mass flow is taken as a basis. A theoretical material temperature dependence is, thus, usually a physical relation corresponding to a formula and temperature and an empirical material temperature dependence is usually gained by measuring a plurality of similar mass flowmeters so that neither the theoretical nor the empirical temperature dependence $K_T$ is a factor describing only the individual device.

The subsequent device-specific temperature dependence e determined in the calibration process relates only to the individual mass flowmeter having been subjected to the calibration process. If it is said that the device-specific temperature dependence is determined "under consideration of the known theoretical or empirical material temperature dependence $K_T$ influencing the mass flow", this means that the known theoretical or empirical material temperature dependence $K_T$ does not influence the device-specific temperature dependence e, rather is specifically eliminated from this. As opposed to other methods, this allows for valuable, significant information about the individual, device-specific behavior of the mass flowmeter to be gained.

In order to determine the mass flow, the known theoretical or empirical material temperature dependence $K_T$ as well as the device-specific temperature dependence e are ultimately taken into account in the computation rule for determining the mass flow in order to have taken all relevant temperature-dependent contributions to mass flow into account.

First using the approach according to the invention, is it at all possible to be able to designate a device-specific temperature influence e, which, for example, is not possible when the calibration of a mass flowmeter is based only on measurement data and no model-like presentation of the expected temperature dependence is used as theoretical or empirical a priori knowledge. In a calibration based only on measurement data, all temperature-dependent influencing factors that are involved in the mass flow overlie one another undifferentiatedly and, for example, cannot be fundamentally differentiated by a measurement under consideration of excitation and deflection signals of the measuring tube.

According to a particularly preferred embodiment of the method according to the invention, it is provided that the device-specific temperature dependence e determined during installation and/or operation of the mass flowmeter is included in the device or production diagnosis. Here, it can be taken into account by the installation of the mass flowmeter at the factory that a certain deviation of the contribution to mass flow brought about by the device-specific temperature dependence is not exceeded, at the same time, however, a calibration process can be run by the user to take all parameters of the installation situation into account.

It is of particular advantage when the device-specific temperature dependence e is determined in certain temporal intervals by the mass flowmeter, since then, the possibility is created to compare a presently determined device-specific temperature dependence e with at least one previously determined device-specific temperature dependence, with which creeping changes in the mass flowmeter or in the entire construction of the mass flowmeter can be detected.

According to a further preferred embodiment of the method according to the invention, it is provided that the theoretical or empirical material temperature dependence $K_T$ and/or the device-specific temperature dependence e are respectively determined in the form of a linear relation. In a particularly preferred embodiment of the invention, the respective contribution to mass flow arises from simple multiplication of a constant with a relevant temperature difference $\Delta T$, as is shown in equation 3:

$$\dot{m} \approx K_R[1+(K_T+e)\Delta T]t_d$$

$$\dot{m} \approx K_R[1+(K_T+\Delta T_1+e\cdot\Delta T_2)]t_d \qquad (3)$$

The shown variation has two different relevant temperature differences $\Delta T_1$ and $\Delta T_2$ illustrates that the theoretical or empirical material temperature dependence $K_T$ and/or the device-specific temperature dependence e can be determined independently of one another in different measuring situations, at different reference temperatures.

According to a further preferred embodiment of the method, the temperature dependence of at least one Young's modulus E of the material used influences the known theoretical or empirical material temperature dependence $K_T$, in particular, namely, the temperature dependence of the Young's modulus E of the tube material. It makes sense to take this relation into account since, on the one hand, the influence of Young's modulus E of the tube material is known in the scope of Coriolis mass flow measurement (see equation 2), on the other hand, since Young's modulus and also its temperature dependence is known for many materials and, for that reason, can be comparably easily used in the scope of a theoretical material temperature dependence $K_T$.

Furthermore, it is provided by a further preferred embodiment of the method that at least one thermal expansion coefficient $\alpha$ influences the known theoretical and empirical material temperature dependence $K_T$, in particular, namely, the expansion coefficient of the tube material. It has been shown to be further advantageous when the temperature dependence of the thermal expansion coefficient $\alpha(T)$ itself is taken into account, which is important, in particular when measuring in expanded temperature ranges.

$$\dot{m} \approx K_R+[1+(K_T(E,\alpha)+e(E,\alpha))\Delta T]t_d$$

$$\dot{m} \approx K_R[1+(K_T(E,\alpha,\Delta T)+e(E,\alpha,\Delta T))\Delta]t_d \qquad (4)$$

According to a preferred embodiment of the method, it is provided that at least one mechanical tube stress dependence is taken into account in the computation rule for determining mass flow, the corresponding mechanical tube stress $(\sigma, \tau)$ is determined on the measuring tube and the measured mechanical tube stress is used to calculate the flow value in the computation rule.

$$\dot{m} \approx K_R+[1+(K_T e)\Delta T+f(\sigma,\tau)]t_d$$

$$\dot{m} \approx K_R[1+(K_T e)\Delta T+f(\sigma(T),\tau(T))]t_d \qquad (5)$$

Preferably, the circumferential stress ($\sigma$) and/or the axial stress ($\tau$) of the measuring tube is or are determined as mechanical tube stress. This occurs, in particular, using strain gauges, which are applied to the measuring tube—preferably in the circumferential direction and the axial direction. The available temperature information is used in order to be able to differentiate between thermal stress conditions and stress conditions caused by force in the detected change in length—in the circumferential or axial direction—since the latter essentially bears the stress information. Preferably, the available temperature information is also used to compensate the resistance information received by the strain gauges.

A further preferred embodiment of the method is characterized in that the mechanical tube stress dependence of the mass flow respectively in the form of a linear relation is taken into account, in particular wherein each contribution to mass flow results by multiplication of a constant with a relevant mechanical stress difference ($\Delta\sigma$, $\Delta\tau$) in:

$$\dot{m} \approx K_R[1+(K_T+e)\Delta T+c_1\cdot\Delta\sigma+c_2\cdot\Delta\tau]t_d \quad (6)$$

In a particularly easily adaptable variation of the method, it is provided that in order to take further temperature dependence into account in the computation rule, a further functional temperature relation is included, this time in combination with the term taking the mechanical stress into account:

$$\dot{m} \approx K_R[1+(K_T+e)\Delta T+f(\sigma,\tau,\Delta T)]t_d \quad (7)$$

It has been shown to be particularly practical when, in order to take the previously mentioned further temperature dependence into account, a second degree polynomial is included in a relevant temperature difference ($\Delta T$), in particular since the number of measurements for determining the parameters is still manageable here:

$$\dot{m} \approx K_R[1+(K_T+e)\Delta T+c_1\cdot\Delta\sigma+c_2\cdot\Delta\tau+c_3\cdot\Delta\tau+c_4\cdot\Delta T^2]t_d \quad (8)$$

The described method can also be used in connection with density measurement, in particular density measurement with the help of a Coriolis mass flowmeter, wherein the values of interest are not mass flow, but rather densities.

According to a further independent teaching of the invention, the object described in the introduction is met with a mass flowmeter operating according to the Coriolis principle having a measuring tube, wherein the measuring tube is excited to vibrate, a phase shift of the vibration of the measuring tube which is dependent on the mass flow of the measuring tube or, respectively, a time difference ($t_d$) corresponding to this is determined, the temperature of the measuring tube is determined and the corresponding mass flow is calculated using the determined time difference ($t_d$) and the determined temperature (T) by means of a computation rule in that the mass flowmeter is designed in such a manner that the above method according to the invention can be carried out.

We claim:

1. Method for installing and operating a mass flowmeter operating according to the Coriolis principle having a measuring tube, comprising the steps of:
    exciting the measuring tube to vibrate,
    determining a phase shift of the vibration of the measuring tube which is dependent on the mass flow of the measuring tube or a time difference ($t_d$) corresponding to said phase shift,
    determining the temperature of the measuring tube, and
    calculating the mass flow using the determined phase shift or time difference ($t_d$) and the determined temperature (T) by means of a computation rule
    wherein, in using the computation rule, at least one known theoretical or empirical material temperature dependence ($K_T$) influencing the mass flow is taken into account,
    wherein, considering known theoretical or empirical material temperature dependence ($K_T$) influencing the mass flow, a device-specific temperature dependence (e) of the mass flowmeter influencing the mass flow is determined through a subsequent calibration process and
    wherein, in the computation rule, the known theoretical or empirical material temperature dependence ($K_T$) as well as the device-specific temperature dependence (e) are taken into account in determining the mass flow.

2. Method according to claim 1, wherein the device-specific temperature dependence is determined during at least one of installation and operation of the mass flowmeter and is included in comparison of a presently determined device-specific temperature dependence (e) with at least one previously determined device-specific temperature dependence.

3. Method according to claim 1, wherein at least one of the theoretical or empirical material temperature dependence ($K_T$) and the device-specific temperature dependence (e) are determined in the form of a linear relation.

4. Method according to claim 1, wherein at least one of the theoretical or empirical material temperature dependence ($K_T$) and the device-specific temperature dependence (e) are determined and wherein the respective contribution to mass flow arises from multiplication with a relevant temperature difference ($\Delta T$).

5. Method according to claim 1, wherein the temperature dependence of at least one Young's modulus (E) of material used influences the known theoretical or empirical material temperature dependence ($K_T$).

6. Method according to claim 1, wherein the influence of at least one thermal expansion coefficient ($\alpha$) on the known theoretical and empirical material temperature dependence ($K_T$) is taken into consideration in the determination thereof.

7. Method according to claim 1, wherein the temperature dependence of the thermal expansion coefficient ($\alpha(T)$) itself is taken into account.

8. Method according to claim 1, wherein at least one mechanical tube stress dependence is taken into account in the computation rule for determining mass flow, the corresponding mechanical tube stress ($\sigma$, $\tau$) being determined on the measuring tube and the measured mechanical tube stress being used to calculate the flow value in the computation rule.

9. Method according to claim 8, wherein at least one of the circumferential stress ($\sigma$) and the axial stress ($\tau$) of the measuring tube is determined as the mechanical tube stress.

10. Method according to claim 8, wherein the mechanical tube stress dependence of the mass flow is taken into account in the form of a linear relation in which each contribution to mass flow results by multiplication of a constant ($c_1$, $c_2$) with a relevant mechanical stress difference ($\Delta\sigma$, $\Delta\tau$).

11. Method according to claim 8, temperature dependence is taken into account as a second degree polynomial.

* * * * *